2,916,115

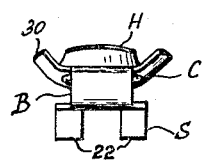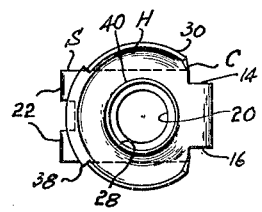
Fig. 2    Fig. 1
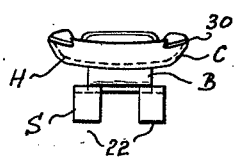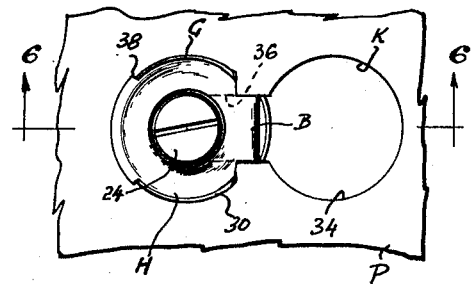
Fig. 3    Fig. 5
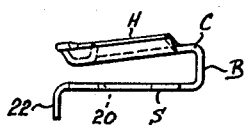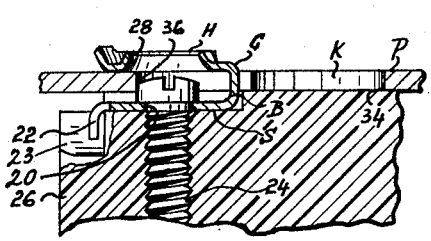
Fig. 4    Fig. 6
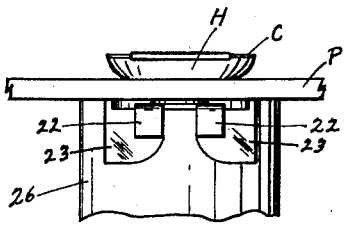
Fig. 7
INVENTORS
CLARENCE R. VAN NIEL AND
JOHN J. SASENA
By Bates, Peare & McBean
ATTORNEYS

# United States Patent Office 2,916,115
Patented Dec. 8, 1959

FASTENING DEVICE

Clarence R. Van Niel, Cleveland, and John J. Sasena, Parma, Ohio, assignors to Tinnerman Products Inc., Cleveland, Ohio, a corporation of Ohio Application November 14, 1956, Serial No. 622,121

4 Claims. (Cl. 189—88)

This invention relates to a fastening device for knobs, handles and like articles of manufacture by which such devices may be easily and quickly secured to a supporting panel by a simple operation taking place entirely from the forward or accessible side of the panel.

In most applications where a handle or knob is secured to a panel or the like, as in the case of a handle for the oven panel of a gas or electric range, it is often necessary and desirable for the handles to be mounted when the structure is completed or set up ready for use. To this end, it is usually found expedient to provide a fastening means which is concealed and is otherwise adapted to provide the desired mounting, but which does not require access to the interior of the structure. In such an arrangement, the fastening device is constructed so that the operator may quickly mount the handle entirely from the forward side of the panel in a minimum of time and effort. Heretofore, separable fasteners of this character had a complicated configuration, contained an excessive number of parts and were expensive to manufacture. In addition, most of the prior fasteners could not be quickly attached to or removed from the panel.

An object of the present invention is to provide a fastening assembly for securing a handle to a panel that is simple in construction, economical to manufacture and that contains a minimum of parts.

Another object of the present invention is to provide a fastening device by means of which a handle or other similar article may be quickly attached to or removed from the accessible side of a panel by simple movement.

Another object of the invention is the provision of a handle mounting means of the above character wherein a handle may be quickly attached to and detached from the accessible side of a panel in the field as well as in the factory and which does not require manipulation of threaded parts to effect attachment to or removal from the panel.

Briefly, the foregoing objects are accomplished by the provision of a spring metal fastening device adapted for securing a handle or knob or the like to a panel. The fastening device comprises a U-shaped clip wherein one of the legs or arms of the clip may comprise a flat rectangular surface having an aperture disposed substantially centrally therein. The aperture is adapted to receive a threaded stud or the like therethrough by means of which the clip is secured to a handle. Formed integral with the outer edge of the rectangular surface may be a pair of downwardly extending projections or tangs adapted to grip a coacting surface on the knob or handle to more securely retain the clip in position thereon and to prevent the handle from rotating on its longitudinal axis with respect to the clip. The other leg of the U comprises a head element having a circular, dish or cup-shaped configuration including a circular, outwardly extending flange disposed on the periphery of the head element. An aperture is disposed substantially centrally in the head element and is adapted to pass a threaded bolt completely therethrough, which coacts with the aperture in the other leg of the U to secure the clip to the handle as aforedescribed. The fastener is particularly adapted for insertion into a key hole slot, merely by inserting the fastener (which is secured to the handle) into the circular opening of the slot in a direction at right angles to the plane of the panel and then sliding the handle along the panel so that the clip enters the longitudinal portion of the slot. When the clip is in position, the side walls of the slot engage the intermediate portion of the flange on the head element. Additionally the flange is adapted to facilitate entry of the clip into the slot and to provide a spring means to securely fasten the clip and the associated handle to the panel thus providing a bayonet type of fastening assembly.

Other objects and advantages of the invention will be apparent from the following description taken in conjunction with the drawings in which:

Fig. 1 is a top plan view of a fastening device constructed in accordance with the invention;

Fig. 2 is a right end elevational view of the fastening device shown in Fig. 1;

Fig. 3 is a left end elevational view of the fastening device shown in Fig. 1;

Fig. 4 is a side elevational view of the fastening device shown in Fig. 1;

Fig. 5 is a top plan view of the fastening device shown in Fig. 6;

Fig. 6 is a side elevational sectional view showing a handle mounted to a panel by means of the fastening device shown in Fig. 1; and Fig. 7 is a front elevational view of the fastening assembly shown in Fig. 6.

Referring to the drawings, there is shown a one-piece fastening device bent in the form of a U-shaped spring clip C, wherein the bottom of the U comprises a base or intermediate portion B and the two arms of the U comprise a head element H and a shank element S respectively as shown. The clip may be formed of any suitable resilient or semi-resilient material such as sheet spring steel. The intermediate portion B is narrower than the arms H and S and has substantially parallel side edges 14 and 16.

The shank element S may comprise a substantially rectangular surface having an aperture 20 disposed substantially centrally therein. Disposed at the outer corners of the shank element may be one or more lugs or fingers 22, which are adapted to grip associated indentations 23 on a handle or bolt holding apparatus or similar object 26 and thereby assist in retaining the clip to the handle or objects as will be hereinafter explained. The aperture 20 is adapted to pass the shank, but not the head of a threaded stud or bolt 24 therethrough, by means of which the clip is retained to the handle 26 as shown in Fig. 6.

The head element H has a dish-shaped configuration with an aperture 28 disposed substantially centrally therein, which is adapted to pass the threaded stud 24 completely therethrough so that it may enter the aperture 20 in the shank element S to retain the clip to the handle as aforementioned. The surface around the aperture 28 may be raised to form an inner circular flange 40 (Fig. 1) on the head element to reinforce the same. The dish-shaped configuration of the head element H provides an outer flange 30 as best shown in Fig. 2.

A typical application of the fastening device is shown in Figs. 5 and 6 wherein, the device is secured to the handle 26 by the threaded stud 24 through the aperture 20 in the shank element of the clip and the device in turn is detachably secured to the panel P. For this purpose, the panel P is formed with a key hole slot K having an enlarged circular portion 34 and an elongated narrow or longitudinal portion 36 in communication with the circular portion. The handle 26 may be of any suitable shape. After the clip is secured to the handle by means of the threaded stud, the handle may be attached to the panel merely by inserting the clip into the circular opening 34 of the key hole slot, in a direction at right angles to the plane of the panel, and then sliding the clip along the panel and into the elongated narrow portion 36 of the key hole slot. Upon insertion of the clip into the elongated portion of the slot, the peripheral flange 30 of the clip engages the intermediate portion of the elongated portion of the key hole slot in spring-like fashion. The forward portion of the flange 30 may have a raised portion 38 (Figs. 1 and 5), which functions as an additional guide means to facilitate the entry of the clip into the longitudinal portion 36 of the key hole slot.

The above fastening assembly has many advantages. For example, the key hole slot K may be formed by a simple stamping process, and the fastening device or clip may be formed by simple stamping and bending operations. The complete assembly has a minimum number of parts and consequently requires a minimum amount of time to effect assembly or disassembly. Only one stud or the like is needed to secure the clip to the handle and no manipulation of threaded parts is required to effect quick and simple attachement and detachment to the panel after the clip is secured to the handle. The construction is positive in action, since a constant force is being applied to hold the handle in assembled relation.

Although in the foregoing description and the accompanying drawings, the disclosure is directed to preferred embodiments of the invention in both knob and handle constructions, it is obvious that the invention is applicable whenever an operating member, push or pull device, gripping or the like is to be mounted onto a supporting wall, particularly a sheet metal wall member. Accordingly, it will be understood that the disclosure is not to be limited to any strict interpretation of the work "handle," but should be considered generally as defining knobs, gripping devices, supporting devices, drawer pulls, and the like articles of manufacture.

The terms and expressions which have been employed are used as terms of description and not of limitation and there is no intention in the use of such terms and expressions, of excluding any equivalents of the features shown and described or portions thereof.

We claim:

1. In combination, a panel having a key-hole slot therein, an operating part such as a handle, attached to the panel, and a fastener attached to the part and mounted in a predetermined position on said panel through said slot detachably securing the part to the panel, said fastener comprising a one-piece sheet metal clip having spring-like characteristics and being bent intermediately to provide two confronting arms and an intermediate portion, said intermediate portion being narrower in width than at least one of said arms, said one of said arms being of generally arcuate configuration in plan view and being received from one side of said panel through the circular portion of said slot into bridging relationship on the other side of said panel with the straight portion of said slot, said intermediate portion of said cilp being disposed in said straight portion of the slot in generally engaged relation with the defining side surfaces thereof, the peripherial edges of said one arm being bent outwardly to form an arcuate-like peripherial flange for facilitating relative movement between said one arm and said panel upon attachment of said clip to said panel, said arms having apertures therein in generally opposed registration with each other, a threaded member, such as a bolt, having a shank portion and a relatively larger head portion received through said apertures, said aperture in said one of said arms being large enough to admit the head of the threaded member therethrough, said aperture in the other of said arms being of a size to freely admit therethrough the shank but not the head of the threaded member, said other of said arms being of flat configuration and having adjacent its free end at least one finger extending out of the plane thereof in a direction away from said one of said arms, said part having a recess receiving said finger therein, the spring-like characteristics of said clip biasing said arms toward one another whereby said one arm is urged into tensioned engagement with said panel adjacent said straight portion of said slot to hold the clip to the panel, said shank portion of the threaded member extending through the aperture in said other of the arms into holding engagement with said part thereby securing said part to said clip.

2. In the combination of claim 1, wherein said part includes a recess receiving said other of the arms therein, whereby said part engages said panel and forces said arms apart against their spring-like resistance to thereby urge said one arm into increased tensioned engagement with said panel.

3. In a fastening device for attaching an article of manufacture such as a handle to an apertured panel and including a one piece resilient clip adapted for assembly with a threaded member such as a bolt wherein the head portion of said threaded member is of greater width than the width of the shank portion thereof, said clip comprising a strip of material bent intermediately to provide an intermediate portion and two vertically spaced arms which extend in the same general direction, one of said arms being substantially flat and having a circular aperture therethrough of a size adapted to permit the free passage of the shank portion of said threaded member but which will prevent the entrance therein of the head portion of the threaded member, the other of said arms being of generally circular configuration in plan view and having a circular aperture therethrough in alignment with said first mentioned aperture, said other of said arms having a flange thereon circumscribing the periphery of said second mentioned aperture and extending outwardly from said other arm in a direction away from said one arm, said one arm having transversely spaced fingers adjacent the free end thereof extending outwardly therefrom in a direction away from said other arm, said second mentioned aperture being larger than said first aperture and adapted to permit the passage therethrough of the head portion of said threaded member, said intermediate portion of said clip being narrower in width than the maximum width of said other of said arms, and means on said other arm for facilitating sliding movement of said other arm relative to the panel upon attachment of said clip to the panel, said means comprising an outwardly turned peripherial edge flange on said other arm disposed in relatively close and partially circumscribing relation to said first mentioned flange whereby the undersurface of said other arm is provided with a minimum panel contacting area.

4. In combination, a panel having a slot therein and a fastener attached to an operating part such as a handle, said fastener extending through said slot into mounted relation on the panel and attaching said part to said panel, said slot having an enlarged portion and a narrower portion communicating with said enlarged portion, said fastener comprising a sheet metal clip having spring like characteristics and being bent intermediately to provide confronting arms and an intermediate portion, one of said arms being of a greater width than said intermediate portion and being in bridging relation with the narrower portion of said slot whereby said intermediate portion of said clip is positioned in said narrower portion of said slot in generally engaged relation with the defining side surfaces thereof, said arms having apertures in generally opposed registration with each other, a threaded member such as a bolt received through said apertures, said threaded member comprising a shank portion and a comparatively wider head portion, said aperture in said one arm being of a size to permit passage therethrough of said head portion of said threaded member, said aperture in the other of said arms being of a size to freely admit therethrough the shank portion of said threaded member but not said head portion, said shank portion passing through said aperture in said other arm and coacting in holding engagement with said operating part thereby securing the latter to said clip, and means on said one arm for facilitating sliding movement of the latter relative to the panel upon attachment of said clip to the panel, said means comprising outwardly turned peripherial edge portions of said one arm.

References Cited in the file of this patent

UNITED STATES PATENTS

| | | |
|---|---|---|
| 2,059,049 | Smith | Oct. 27, 1936 |
| 2,101,287 | Tinnerman | Dec. 7, 1937 |
| 2,621,357 | Stuman | Dec. 16, 1952 |
| 2,822,198 | Priestman | Feb. 4, 1958 |

FOREIGN PATENTS

| | | |
|---|---|---|
| 538,638 | Great Britain | Aug. 11, 1941 |